United States Patent
Todorovic

(10) Patent No.: US 10,202,940 B2
(45) Date of Patent: Feb. 12, 2019

(54) ENGINE COWLING OF AN AIRCRAFT GAS TURBINE

(71) Applicant: Rolls-Royce Deutschland Ltd & Co KG, Blankenfelde-Mahlow (DE)

(72) Inventor: Predrag Todorovic, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 306 days.

(21) Appl. No.: 15/093,387

(22) Filed: Apr. 7, 2016

(65) Prior Publication Data

US 2016/0305371 A1    Oct. 20, 2016

(30) Foreign Application Priority Data

Apr. 17, 2015  (DE) .................. 10 2015 206 985

(51) Int. Cl.
| | |
|---|---|
| F02K 1/72 | (2006.01) |
| F02K 1/62 | (2006.01) |
| F02K 1/64 | (2006.01) |
| F02K 1/76 | (2006.01) |

(52) U.S. Cl.
CPC ............ *F02K 1/625* (2013.01); *F02K 1/64* (2013.01); *F02K 1/72* (2013.01); *F02K 1/763* (2013.01); *F05D 2250/314* (2013.01); *Y02T 50/671* (2013.01)

(58) Field of Classification Search
CPC ... F02K 1/625; F02K 1/64; F02K 1/72; F02K 1/763; F05D 2250/314
See application file for complete search history.

(56) References Cited

U.S. PATENT DOCUMENTS

| | | | |
|---|---|---|---|
| 3,024,605 A | 1/1962 | Brewer et al. | |
| 3,015,936 A | 3/1962 | Nash | |
| 5,228,641 A | 7/1993 | Remlaoui | |
| 5,937,636 A * | 8/1999 | Gonidec | F02K 1/74 239/265.31 |
| 7,484,356 B1 * | 2/2009 | Lair | F02K 1/72 60/226.2 |
| 8,464,512 B2 | 6/2013 | Vauchel et al. | |
| 8,511,973 B2 | 8/2013 | Ramlaoui et al. | |
| 2010/0040466 A1 | 2/2010 | Vauchel et al. | |
| 2011/0088369 A1 * | 4/2011 | Maalioune | F02K 1/76 60/204 |

(Continued)

FOREIGN PATENT DOCUMENTS

| | | |
|---|---|---|
| EP | 1878904 A2 | 1/2008 |
| EP | 3023624 A1 | 5/2016 |

(Continued)

OTHER PUBLICATIONS

European Search Report dated Sep. 19, 2016 for counterpart European Application No. 16164261.6.

(Continued)

*Primary Examiner* — Steven Sutherland
(74) *Attorney, Agent, or Firm* — Shuttleworth & Ingersoll, PLC; Timothy Klima

(57) ABSTRACT

An engine cowling of an aircraft gas turbine with a front area and a rear area that is displaceable in the axial direction, characterized in that the rear area is mounted and supported by means of multiple length-adjustable thrust reversal actuators that are arranged at an angle to one another.

8 Claims, 3 Drawing Sheets

(56) References Cited

U.S. PATENT DOCUMENTS

Figure 1:
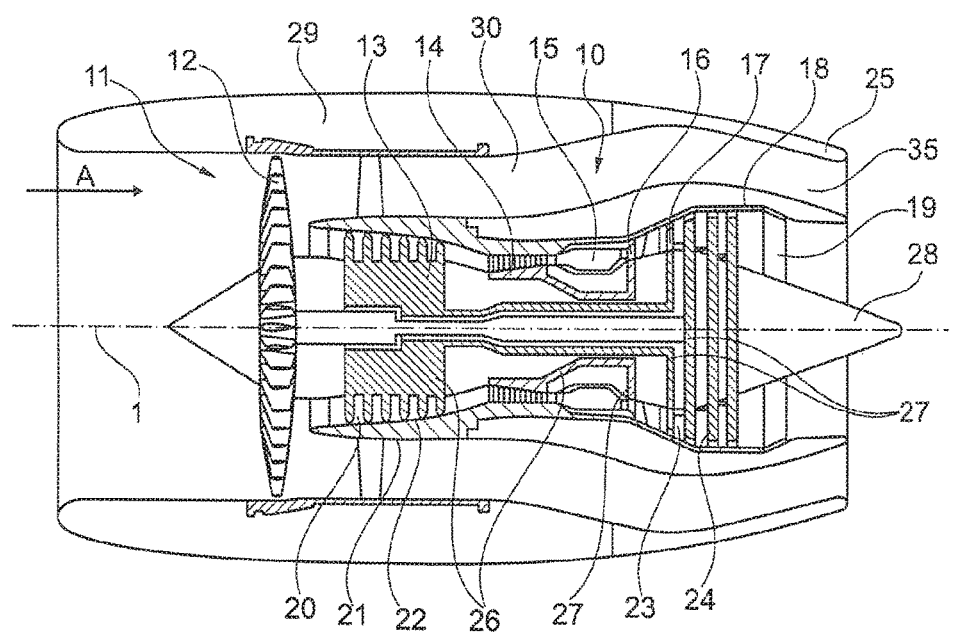

2011/0139925 A1    6/2011   Lisiewicz et al.

FOREIGN PATENT DOCUMENTS

FR          2921976 A1     4/2009
WO       WO02103189 A1    12/2002

OTHER PUBLICATIONS

German Search Report dated Dec. 23, 2015 from counterpart German App No. 102015206985.0.
European Office Action dated Nov. 23, 2018 from counterpart EP App No. 16164261.6.

* cited by examiner

ENGINE COWLING OF AN AIRCRAFT GAS TURBINE

This application claims priority to German Patent Application DE102015206985.0 filed Apr. 17, 2015 the entirety of which is incorporated by reference herein.

DESCRIPTION

The invention relates to an engine cowling of an aircraft gas turbine according to features as disclosed herein.

In particular, the invention relates to an engine cowling (nacelle) of an aircraft gas turbine, comprising a stationary front area and a rear area that is displaceable in the axial direction. For one thing, the displacement of the rear area is effected for the purpose of opening an annular space between the front area and the rear area, so as to discharge the air flow from the bypass duct for thrust reversal. Furthermore, the rear area can be displaced by a shorter distance in order to modify the area nozzle of the bypass duct (cold nozzle) in its cross-section (VAN, variable area nozzle). Here, a small amount of air is discharged through the annular gap that is opened. This constellation is used to realize a maximal thrust of the aircraft gas turbine, for example. Additionally, this second position is also to be displaced in order to achieve the thrust reversal position.

It is known in the state of the art to guide and to mount the rear area of the engine cowling by means of rails. Such rail constructions, which can either be embodied in a telescope-like manner or in which guide rollers or the like glide along the rails, require elaborate constructions, are expensive to manufacture and lead to an increase in the weight of the entire aircraft gas turbine, since a support structure is required. Here, it is in particular necessary to reinforce rail systems so that they may resist lateral air flows or wind influences, for example in the event of a crosswind landing. Furthermore, these rail systems require an aerodynamic fairing (beaver tail fairing), which has a negative effect on performance.

In known constructions it has proven to be a disadvantage that, in addition to the above-mentioned increase in weight, additional friction is created. This additional friction makes stronger drive mechanisms necessary, which in turn results in more weight and greater space requirements. With a view to the space requirements, it has also proven to be disadvantageous that the accessibility of the components for purposes of maintenance is restricted.

The invention is based on the objective to create an engine cowling of the kind as it has been mentioned in the beginning, in which the disadvantages of the state of the art are avoided, while it is characterized by a simple structure as well as a simple and cost-effective manufacturing process, and at the same time facilitates safe mounting of the rear area of the engine cowling.

The objective is solved by a combination of features as disclosed herein, with the present disclosure showing further advantageous embodiments.

Thus, it is provided according to the invention that the rear area is mounted and supported by means of multiple length-adjustable thrust reversal/VAN actuators that are arranged at an angle to each other. In thrust reversers, thrust reversal/VAN actuators according to the state of the art are always arranged in parallel to the engine axis.

Therefore, the solution principle according to the invention can substantially do without the rail constructions known from the state of the art. Instead, the actuators that are needed for the displacement of the rear area of the cowling are themselves used as load-bearing mounting elements. Thanks to this construction, it is in particular possible to sustain any occurring side loads, such as they may occur for example due to microbursts or during a crosswind landing, in a manner that is particularly operationally safe. In addition, a concentric mounting of the rear area of the engine cowling is guaranteed in all three operational positions (cruise flight, thrust reversal and modification of the cross-section of the area nozzle (VAN)). Here, it is provided in a particularly advantageous further development of the invention that the thrust reversal actuators form a framework structure. At that, they are preferably mounted in a hinged manner at their respective end areas, so that changes in length of the thrust reversal actuators contribute to the statics-based overall structure (Thruss principle).

The solution according to the invention ensures reliable and operationally safe mounting of the rear area in all three operational positions, namely in the cruise flight configuration in which the rear area has been displaced forward so as to connect to the front area, in a position for maximal thrust with a partial displacement of the rear area, as well as in a thrust reversal position with a complete backwards displacement. Here, rail systems with castors or the like can be substantially dispensed with. However, the upper rail systems can be retained as a safety mechanism. Without the upper rail systems, the solution according to the invention could also be used for thrust vectoring.

Thus, the overall result is a considerable weight reduction and a reduction of the aerodynamic losses of the outer flow. Further, particularly the access to the rear area of the aircraft gas turbine for maintenance purposes is considerably facilitated.

Figure 2:
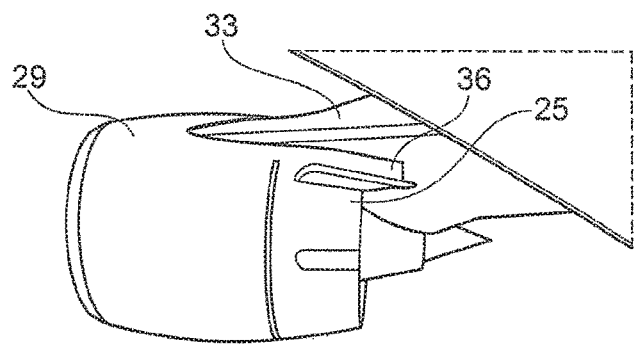
Figure 3:
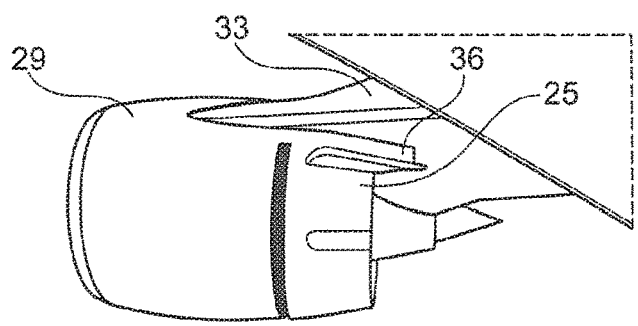
Figure 4:
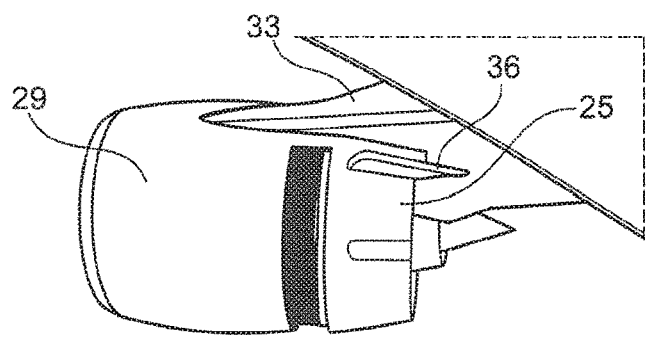
Figure 5:
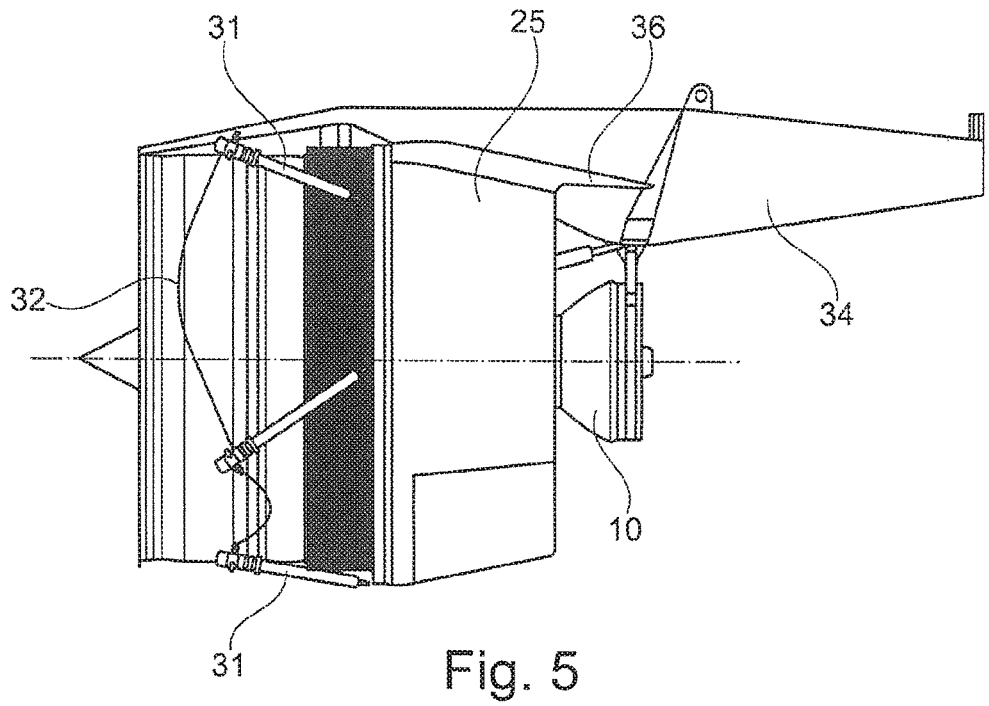
Figure 6:
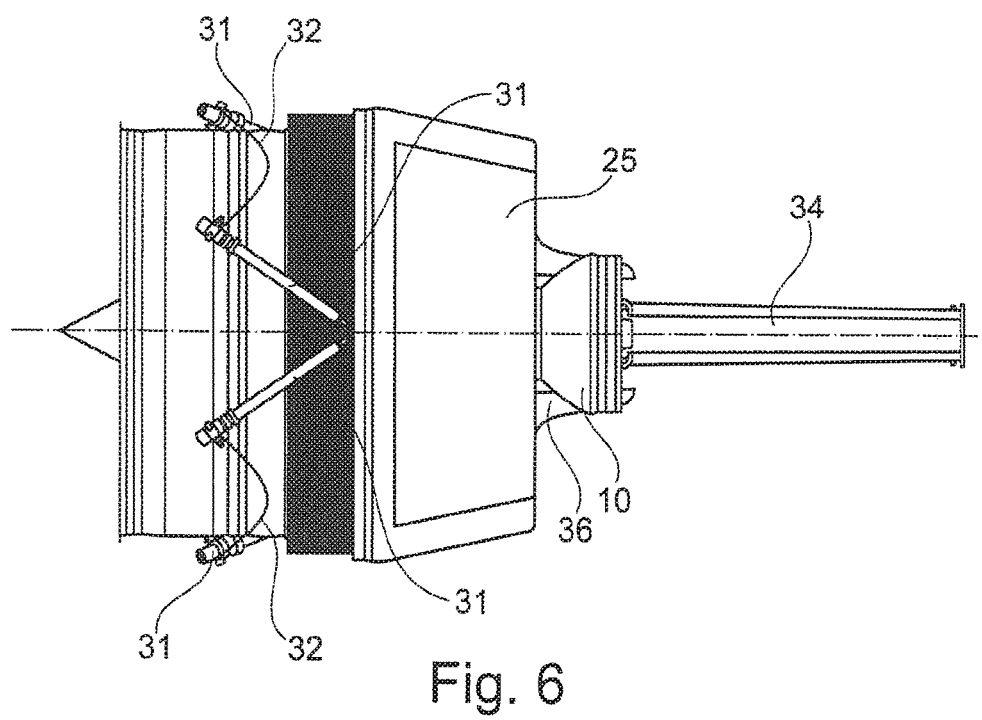

In the following, the invention is described based on an exemplary embodiment in connection with the drawing. Herein:

FIG. 1 shows a schematic rendering of a gas turbine engine according to the present invention, FIGS. 2-4 show simplified perspective views of an engine cowling of an aircraft gas turbine in different operational states, FIG. 5 shows a simplified side view of an exemplary embodiment of the engine cowling according to the invention, and FIG. 6 shows a bottom view according to FIG. 5.

The gas turbine engine 10 according to FIG. 1 represents a general example of a turbomachine in which the invention may be used. The engine 10 is embodied in a conventional manner and comprises, arranged in succession in the flow direction, an air inlet 11, a fan 12 that is circulating inside a housing, a medium-pressure compressor 13, a high-pressure compressor 14, a combustion chamber 15, a high-pressure turbine 16, a medium-pressure turbine 17 and a low-pressure turbine 18 as well as an exhaust nozzle 19, that are all arranged around a central engine axis 1.

The medium-pressure compressor 13 and the high-pressure compressor 14 respectively comprise multiple stages, each of which has an array of fixedly attached, stationary guide blades 20 extending in the circumferential direction, which are generally referred to as stator blades and protrude radially inwards from the core engine cowling 21 through the compressors 13, 14 into a ring-shaped flow channel. The compressors further have an array of compressor rotor blades 22 that protrude radially outwards from a rotatable drum or disc 26 coupled with hubs 27 of the high-pressure turbine 16 or the medium-pressure turbine 17.

The turbine sections 16, 17, 18 have similar stages, comprising an array of fixedly attached guide blades 23 that protrude radially inward from the housing 21 through the turbines 16, 17, 18 into the ring-shaped flow channel, and a subsequent array of turbine blades 24 that protrude outward from a rotatable hub 27. During operation, the compressor drum or the compressor disc 26 and the blades 22 arranged thereon as well as the turbine rotor hub 27 and the turbine blades 24 arranged thereon rotate around the engine axis 1.

FIGS. 2 to 4 show, respectively in simplified perspective view, an engine cowling of an aircraft gas turbine. The aircraft gas turbine is mounted in the usual manner by means of a suspension device 34 (see FIGS. 5 and 6) at the wing of an aircraft that is not shown in any more detail here. The suspension device 34 is clad with a suspension fairing 33. FIGS. 2 to 4 show that the engine cowling comprises a stationary front area 29 and a displaceable rear area 25. FIG. 4 shows a cruise flight configuration in which the rear area 25 is displaced forward and directly connects to the front area 29. In FIG. 3, an operating state is shown in which the rear area 25 is partially displaced backward. This displacement is effected in order to modify the cross-section of the area nozzle 35 of the bypass duct 30, as it is known from the state of the art. This operating state is used for maximal thrust. FIG. 4 shows a third operating state, in which the rear area 25 is completely displaced so as to open up an annular space through which the air stream in the bypass duct 30 can be discharged for the purpose of thrust reversal. The reference sign 36 shows the cowling extension, which serves for accommodating guide rails, or the like.

FIGS. 5 and 6 show a simplified rendering of an exemplary embodiment of the invention, with FIG. 5 showing a side view, wherein the front area 29 of the engine cowling is not shown. There is also no detailed rendering of the cowling of the core engine 10.

FIGS. 5 and 6 show thrust reversal actuators 31, which are for example embodied so as to have a telescope-like effect and which can be driven in a hydraulic or electrical manner. Here, the thrust reversal actuators 31 are respectively arranged at an angle to one another, and thus form a framework-like construction (Thruss principle). It is to be understood that the pivot points of the thrust reversal actuators 31 have to be embodied in a hinged manner in order to ensure that the construction is statically indeterminate. The individual thrust reversal actuators 31 are connected or coupled to one another by means of synchronization elements 32, such as for example sync cables or the like, in order to ensure and to monitor smooth operation. Thus, the construction according to the invention results in a statically safe mounting of the rear area 25 of the engine cowling in every operating state (see FIGS. 2 to 4). In the context of the invention it can be advantageous to additionally provide rails in the upper area (see FIG. 5) which are accommodated in the two lateral cowling extensions 36 that extend on both sides of the suspension cowling 33.

PARTS LIST 1 engine axis
10 gas turbine engine/core engine
11 air inlet
12 fan
13 medium-pressure compressor (compactor)
14 high-pressure compressor
15 combustion chamber
16 high-pressure turbine
17 medium-pressure turbine
18 low-pressure turbine
19 exhaust nozzle
20 guide blades
21 core engine cowling
22 compressor rotor blades
23 guide blades
24 turbine rotor blades
25 rear area of the engine cowling
26 compressor drum or compressor disc
27 turbine rotor hub
28 outlet cone
29 rear area of the cowling
30 bypass duct
31 thrust reverser actuator
32 synchronization element
33 suspension fairing
34 suspension device
35 area nozzle
36 cowling extension

The invention claimed is:

1. An engine cowling of an aircraft gas turbine, comprising:
a front area, and
a rear area that is displaceable in an axial direction,
a plurality of thrust reversal actuators that are length-adjustable and arranged at a non-zero angle to one another, the plurality of thrust reversal actuators each having a first end and a second end, the first ends being mounted to the aircraft gas turbine to support the plurality of thrust reversal actuators,
wherein the rear area is directly mounted to, and supported by, the second ends of the plurality of thrust reversal actuators,
wherein the plurality of thrust reversal actuators form a framework structure between the first ends and the rear area.

2. The engine cowling according to claim 1, wherein the plurality of thrust reversal actuators are hinge mounted at at least one chosen from the first ends and the second ends.

3. The engine cowling according to claim 1, wherein the plurality of thrust reversal actuators are hydraulic or electric actuators.

4. The engine cowling according to claim 1, further comprising synchronization elements coupling the plurality of thrust reversal actuators to one another.

5. The engine cowling according to claim 1, wherein the plurality of thrust reversal actuators are distributed around a circumference of the aircraft gas turbine.

6. The engine cowling according to claim 1, wherein the rear area is axially displaceable into a cruise flight position, into a position for maximal thrust and into a thrust reversal position.

7. An engine cowling of an aircraft gas turbine, comprising:
a front area, and
a rear area that is displaceable in an axial direction,
a plurality of thrust reversal actuators that are length-adjustable and arranged at a non-zero angle to one another, the plurality of thrust reversal actuators each having a first end and a second end, the first ends being mounted to the aircraft gas turbine to support the plurality of thrust reversal actuators,
wherein the rear area is mounted to, and supported by, the second ends of the plurality of thrust reversal actuators,
wherein the plurality of thrust reversal actuators form a framework structure between the first ends and the rear area, and
rails extending in the axial direction, and arranged only in an upper area of the engine cowling.

8. An engine cowling of an aircraft gas turbine, comprising:
- a front area, and
- a rear area that is displaceable in an axial direction,
- a plurality of thrust reversal actuators that are length-adjustable and arranged at a non-zero angle to one another, the plurality of thrust reversal actuators each having a first end and a second end, the first ends being mounted to the aircraft gas turbine to support the plurality of thrust reversal actuators,
- wherein the rear area is mounted to, and supported by, the second ends of the plurality of thrust reversal actuators, wherein the plurality of thrust reversal actuators form a framework structure between the first ends and the rear area,
- wherein mounting positions of the second ends on the rear area are fixed in relationship to one another.

\* \* \* \* \*